(12) United States Patent
Van Den Berg

(10) Patent No.: US 8,220,412 B2
(45) Date of Patent: Jul. 17, 2012

(54) MILKING IMPLEMENT

(75) Inventor: Karel Van Den Berg, Bleskensgraaf (NL)

(73) Assignee: Maasland N.V., Maassluis (NL)

( * ) Notice: Subject to any disclaimer, the term of this patent is extended or adjusted under 35 U.S.C. 154(b) by 170 days.

(21) Appl. No.: 12/439,838

(22) PCT Filed: Aug. 15, 2007

(86) PCT No.: PCT/NL2007/000190
§ 371 (c)(1), (2), (4) Date: Mar. 4, 2009

(87) PCT Pub. No.: WO2008/030084
PCT Pub. Date: Mar. 13, 2008

(65) Prior Publication Data
US 2010/0186676 A1 Jul. 29, 2010

(30) Foreign Application Priority Data

| | | | |
|---|---|---|---|
| Sep. 5, 2006 | (NL) | ................................ | 1032430 |
| Sep. 5, 2006 | (NL) | ................................ | 1032431 |
| Sep. 5, 2006 | (NL) | ................................ | 1032432 |
| Sep. 5, 2006 | (NL) | ................................ | 1032433 |
| Sep. 5, 2006 | (NL) | ................................ | 1032434 |

(51) Int. Cl.
*A01J 3/00* (2006.01)
*A01J 5/00* (2006.01)

(52) U.S. Cl. ............... 119/14.08; 119/14.01; 119/14.02; 119/14.14; 119/14.51; 119/14.11; 119/14.18; 119/14.46; 119/14.19; 119/14.38; 119/14.47

(58) Field of Classification Search ............... 119/14.08, 119/14.01, 14.02, 14.1, 14.14, 14.47, 14.03, 119/14.51, 14.11, 14.18, 14.46, 14.19, 14.38
See application file for complete search history.

(56) References Cited

U.S. PATENT DOCUMENTS

| | | | | |
|---|---|---|---|---|
| 5,056,466 | A | * | 10/1991 | Dessing et al. ................ 119/525 |
| 6,463,877 | B1 | * | 10/2002 | van der Lely .............. 119/14.08 |
| 6,532,893 | B1 | * | 3/2003 | Edholm ..................... 119/14.47 |
| 7,231,886 | B2 | | 6/2007 | Van Den Berg et al. |
| 2002/0033137 | A1 | * | 3/2002 | van der Lely et al. ....... 119/14.1 |
| 2005/0066904 | A1 | * | 3/2005 | Berg et al. .................. 119/14.08 |
| 2008/0202429 | A1 | * | 8/2008 | Hagglund et al. ........... 119/14.1 |

FOREIGN PATENT DOCUMENTS

| | | | |
|---|---|---|---|
| EP | 1279327 | A2 | 1/2003 |
| EP | 1447002 | A1 * | 8/2004 |
| EP | 1523878 | A1 | 4/2005 |
| NL | 1024522 | C | 4/2005 |
| WO | 98/46069 | A1 | 10/1998 |
| WO | 00/13491 | A1 | 3/2000 |

* cited by examiner

*Primary Examiner* — Andrea Valenti
(74) *Attorney, Agent, or Firm* — Coraline J. Haitjema; David P. Owen; Hoyng Monegier LLP

(57) ABSTRACT

A milking implement comprising a frame with, disposed thereon, at least one teat cup holder with a teat cup movable relative thereto, and a replacing element connected with the teat cup, wherein the frame further includes an intermediate arm connected with the frame and with the teat cup holder and having a first joint and a second joint about which the teat cup holder and the intermediate arm, respectively, are tiltable with the aid of the replacing element, and a spring coupled with the teat cup holder and the frame and, if desired, with the intermediate arm.

59 Claims, 6 Drawing Sheets

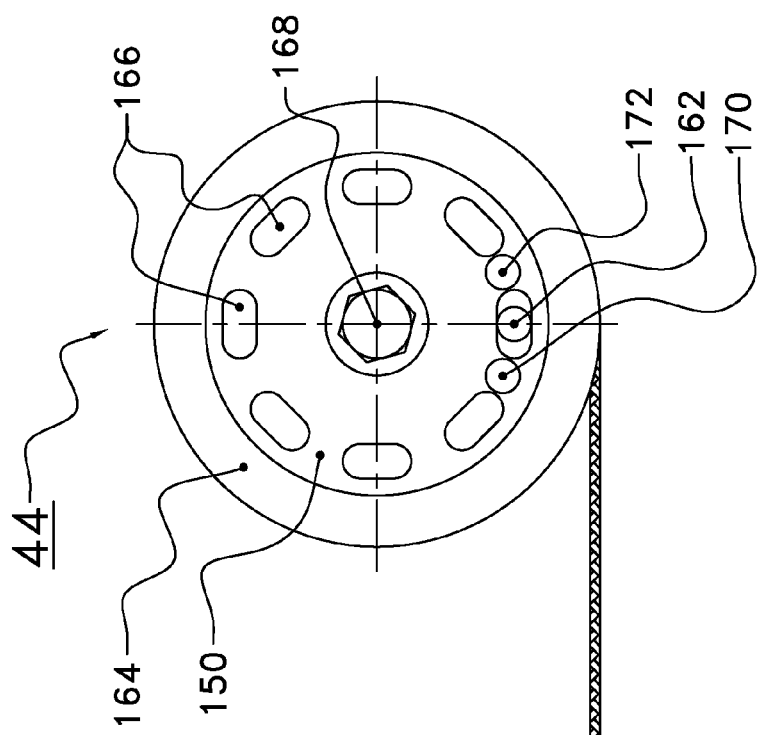
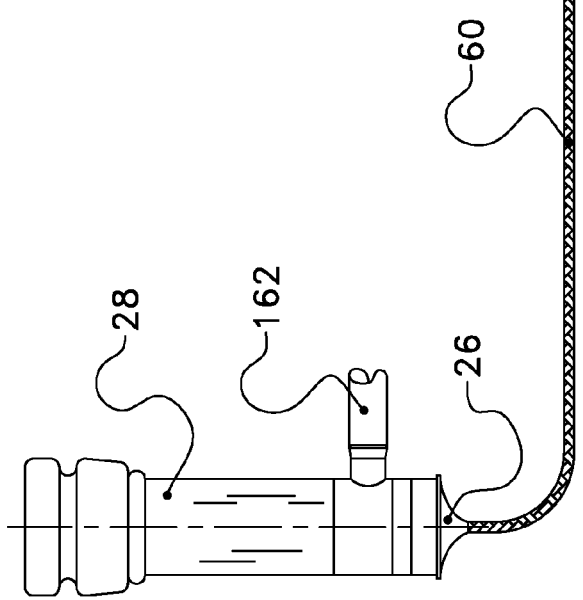
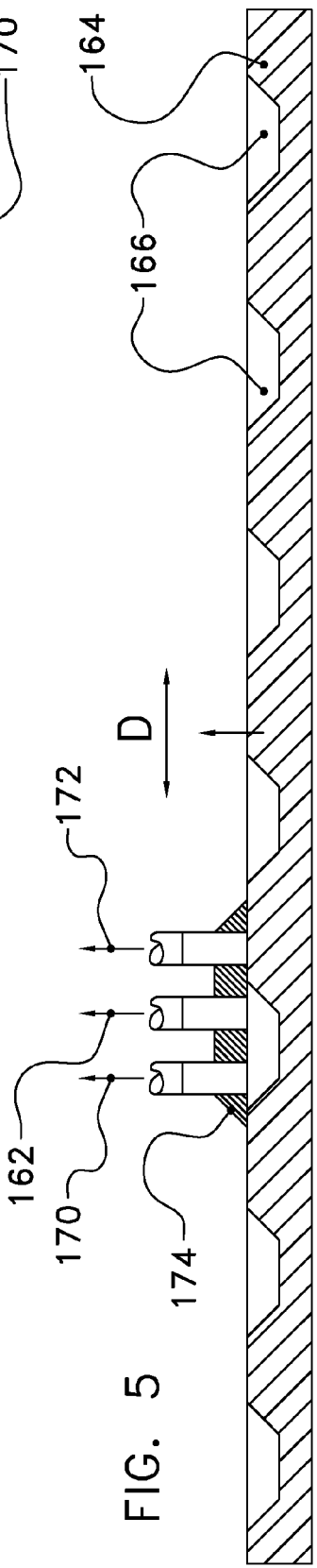
FIG. 4
FIG. 5

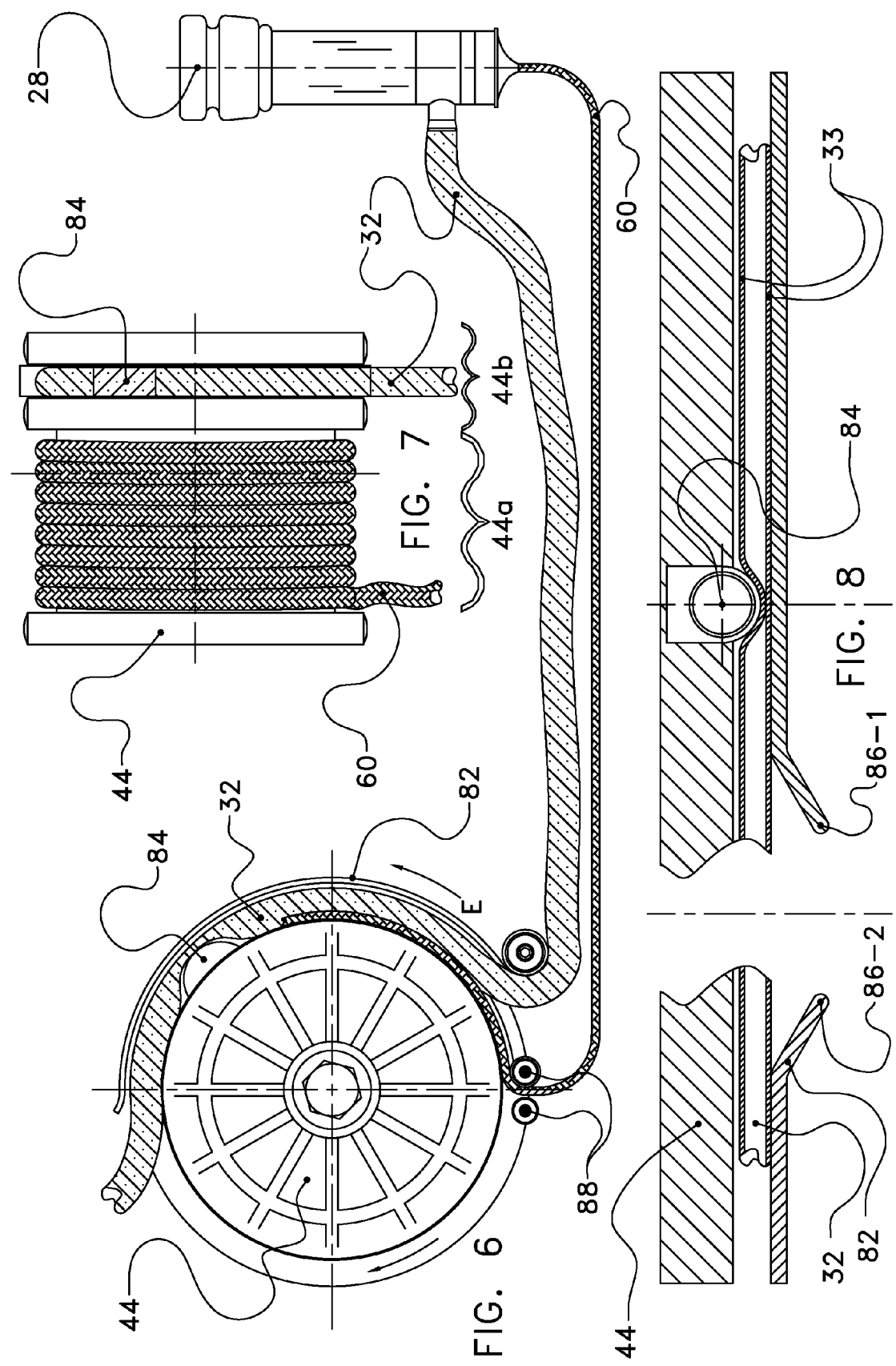

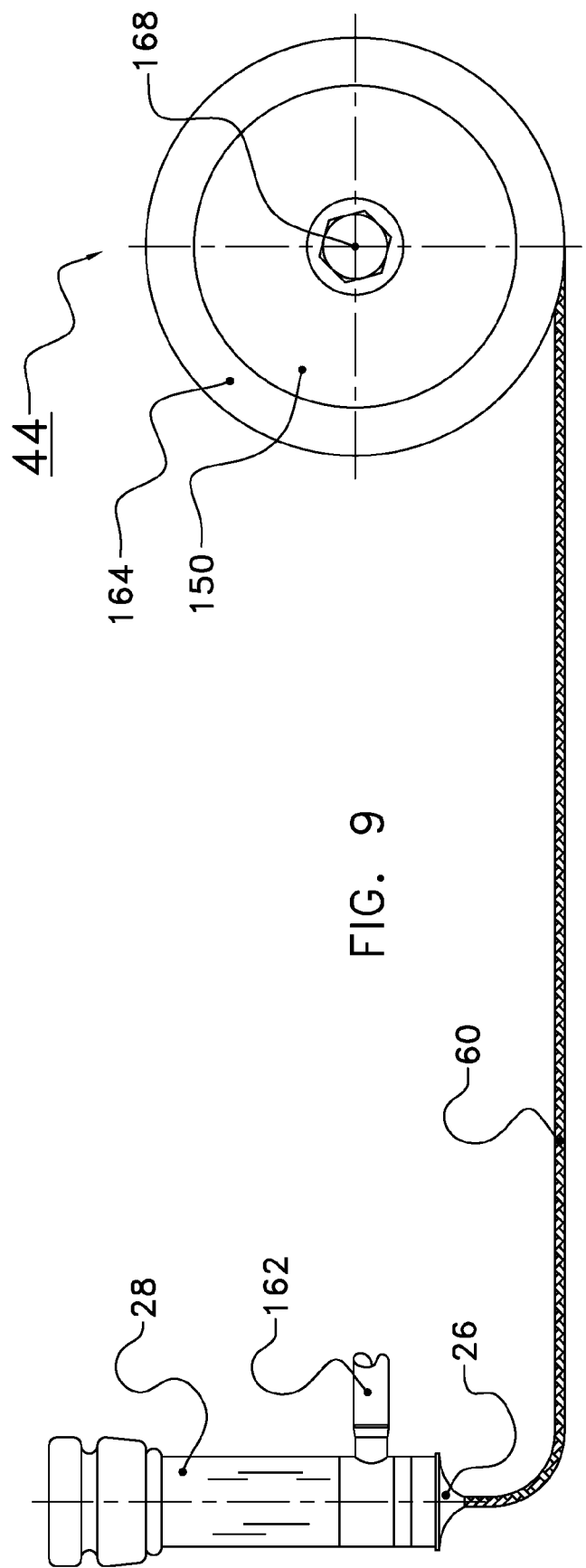

MILKING IMPLEMENT

This application is a 371 of international application no. PCT/NL2007/000190, filed on Aug. 15, 2007, the contents of which are hereby incorporated by reference in their entirety. This application claims priority from Netherlands application nos. 1032430, 1032431, 1032432, 1032433, and 1032434, all filed on Sep. 5, 2006, the contents of which are all hereby incorporated by reference in their entirety.

BACKGROUND OF THE INVENTION

1. Field of the Invention

The present invention relates in general to a milking implement. In particular, the invention relates, in a first aspect, to a milking implement comprising a frame with, disposed thereon, at least one teat cup holder with a teat cup movable relative thereto, and a replacing element connected with the teat cup.

2. Description of the Related Art

Dutch patent document NL 1024522 C discloses a teat cup carrier carrying at its upper side teat cups and milking means. The teat cups are capable of attaching the teat cups in an operative position with the aid of upwardly movable teat cup grippers.

A disadvantage of the known milking implement is that the teat cups, after use, cannot be stored in a reliable and little space occupying manner in which they are protected against contamination.

BRIEF SUMMARY OF THE INVENTION

The milking implement according to the first aspect of the invention aims at providing a storage possibility for the teat cups which is compact and protected against contamination.

The invention, in the first aspect, achieves this object by means of a milking implement comprising a frame with, disposed thereon, at least one teat cup holder with a teat cup relative thereto, a replacing element connected with the teat cup, wherein the frame further comprises an intermediate arm connected with the frame and with the teat cup holder and having a first joint and a second joint about which the teat cup holder and the intermediate arm, respectively, are tiltable with the aid of the replacing element, and a teat cup holder positioning element coupled with the teat cup holder and the frame and, if desired, with the intermediate arm. Such a milking implement provides the possibility of tilting the teat cups via the teat cup holder. This guarantees that no impurities or at least a much lower amount of impurities will get into the teat cup from above. The teat cups are preferably tiltable to the horizontal and, more preferably, to an angle greater than 90° with respect to the vertical. At such an angle, it is in principle impossible for impurities to fall into the teat cup from above.

Moreover, because of the two-stage tilting, the whole of sub-frame, intermediate arm and teat cup holder will become somewhat more compact, so that the milking implement will need less space and will be more easily positionable to under, for example, a next cow.

Furthermore, there is provided the possibility of tilting taking place in two phases, a first tilting in which the teat cup is lowered to some extent, by means of a favorable tilting point position, followed by a second tilting in which the great angle with respect to the vertical is substantially reached, over a second tilting point. This will be set out in further detail hereinafter.

In a particular embodiment, the first and second joints are adapted to tilt in the same plane. In case of tilting in the same plane, it is possible for the teat cup to be stored on the teat cup holder in a compact manner in the milking implement. If the joints would be adapted to tilt in different planes, the teat cup would always project to some extent, although this is not excluded according to the invention.

In a special embodiment, a line through the first joint and the second joint makes an angle b with the frame. In this case, it is assumed that the frame is parallel to the horizontal, at least to the ground. Here, the angle b is unequal to 0, and preferably between 15° and 45°, for example approximately 30°. If the first and second joints are arranged in a line making an angle b with the frame, it can be guaranteed in a simple manner that, at a first tilting, the teat cup will be lowered in height and subsequently, when tilting about the second tilting point, will be able to tilt to, for example, the horizontal. In this case, it is assumed that the tilting point near the teat cup is the highest positioned tilting point.

In a particular embodiment, the first joint is adapted to tilt over an angle c, c being at least as great as b. At such tilting angles it is efficiently guaranteed that the teat cup, when tilting about the first joint positioned near the teat cup, will be lowered relative to the frame, and it is in particular guaranteed that the teat cup will be lowered at any rate when tilting about the other, second tilting point.

In a particular embodiment, the second joint is adapted to tilt over an angle d, the angle c and the angle d forming together at least a right angle. In this embodiment, it is efficiently guaranteed that the two tiltings over the angle c about the first joint and the angle d about the second joint may result in a position in which the teat cup makes at least a right angle with the vertical, and preferably an even greater angle, in order to prevent contamination by falling dirt. In this case, a further advantage is that tilting takes place in two phases via the intermediate arm, because, by not tilting over an angle of 90°, it is possible for the intermediate arm to keep the lower side of the teat cup somewhat above the sub-frame, so that it is possible for the upper side of the teat cup to tilt more than 90°.

In a preferred embodiment, the milking implement comprises a plurality of teat cup holders, each having a teat cup, a replacing element, a first and a second joint, and a spring. The spring serves to bring the teat cup into an upright operative position when the replacing element relaxes. Incidentally, it is also possible to do this in a functionally reverse way, i.e. that the teat cup will be brought, on the contrary, into the (approximately) horizontal stored position when the replacing device relaxes. It is possible for the person skilled in the art to perform himself such a mechanical reversal in a simple manner.

In this case, the spring may be coupled with the teat cup holder, the intermediate arm and the sub-frame. In operative condition, the replacing element, for example, might pull in the first instance the teat cup holder, so that the latter will tilt about the first joint after overcoming the spring force moment of the spring about the first joint. After complete tilting about the first joint, it is then possible for the replacing element, after overcoming the spring force moment of the spring about the second joint, to tilt subsequently the intermediate arm about the second joint. In this case, it is advantageous if the force moment of the spring about the first joint is smaller than the force moment of the spring about the second joint, so that the two tiltings will take place in the desired sequence.

In a special embodiment, at least two teat cup holders have at least one joint comprising a pivot allowing tilting in one tilting plane, at least two of the tilting planes making an angle unequal to zero with respect to each other. In this case, there are preferably provided four teat cup holders that are arranged in a trapezium shape, the tilting planes intersecting at the short side of the trapezium. In this manner, there is provided a milking implement that is capable of storing the usual four teat cups in a very compact manner and that, moreover, is capable of being positioned in a simpler manner between and in the vicinity of the hind legs of the cow or other dairy animal. For the hind legs of the cow or the like will often be located very close to the hind legs, which limits the positioning space. It is then possible to place the mentioned embodiment in a simpler manner without irritation for the cow.

Moreover, the milking implement may be provided with one or more of the particular features mentioned hereinafter. It is stressed here that the additional and optional features mentioned herebelow for the first aspect, are also applicable, and again optional, for the second, third, fourth and fifth aspects of the invention, to be mentioned below.

The frame comprises in particular a mobile vehicle, in particular an autonomous mobile vehicle. The milking implement may be designed as a milking robot in which the frame is a robot arm. The robot arm is then movable, for example for placing the sub-frame with the teat cups to under a cow or the like. In this case, the dairy animal in question is led to a milking parlour where the milking implement is located. However, the invention relates in particular and very advantageously to an autonomous mobile vehicle. The latter embodiment, even more than a stationary milking implement, should be as compact as possible. An autonomous mobile milking implement does not only have to perform manoeuvring between legs, etc. Such an implement has often also other sub-devices "on board", such as a milk storage, cleaning means, etc. This makes it even more important to design each component as compactly as possible.

The frame may be provided with at least two displacing means, in particular caterpillar tracks or wheels, preferably moreover with at least one additional displacing means or a sliding element. It may be sufficient for the frame mobile in this manner to have two wheels for a sufficiently smooth displacement.

Preferably, the frame moreover comprises a component that facilitates displacement at a third supporting point, such as an additional wheel or a sliding element. One, or preferably two additional wheels, so that in total four wheels are provided, give an optimum driving comfort. On the other hand, an additional ball wheel, for example, provides a greater manoeuvrability. A possibly provided sliding element has, on the other hand, the advantage of allowing an extraordinarily robust design and of not being hindered by contamination.

In a particular embodiment, the milking implement further comprises a motor for driving at least one of the at least two displacing means. By means of such a motor the milking implement is self-propelled, and therefore need not be displaced by an operator. Such provisions have, of course, advantages in relation to the amount of work to be done by an operator, which amount may thus become very small. A motor control is advantageously provided for the driving motor. The latter may be connected, for example, with a GPS-system or the like for orientation of the milking implement in the area where it is located.

In a preferred embodiment, the milking implement further comprises a milk storage vessel. In this embodiment, the milking implement is in principle completely autonomous. After milking a cow or other animal, or several animals in the case of a sufficiently large milk storage vessel, the milking implement is capable of driving either autonomously or not to a larger milk storage tank in order to supply therein the contents of the milk storage vessel. A disadvantage of providing such a milk storage vessel is that, of course, space is needed for storing the milk. An advantage, however, is that no hoses are needed, behind which an animal or the implement may get caught, etc. However, in another embodiment the milking implement may also be connectable or connected with a milk storage tank by means of a milk transport line. It is then possible to design such a milking implement as a particularly compact one.

In a special embodiment, the milk storage vessel is disposed at least partially within the pulsator reel and/or the winding reel. In this embodiment, there is made optimum use of the in principle wasted hollow space of the pulsator reel and/or the winding reel. By disposing a milk storage vessel therein, said space is employed usefully, which results in a compact milking implement.

In particular, the milking implement further comprises a teat detecting means, a teat cleaning device and/or a teat cup cleaning device. Such means are known in the state of the art and serve to obtain a milking implement that is more reliable, more hygienic, etc. However, it is also possible for the person skilled in the art to combine the milking implement with any other means known in the state of the art in order to obtain the advantages related thereto.

In a second aspect, the invention relates to a milking implement comprising a frame, a sub-frame with a bottom, and connected with the frame and adjustable in height relative thereto, at least one teat cup holder with a teat cup movable relative thereto, fastened to the bottom of the sub-frame, a replacing element connected with the teat cup, and a milk line comprising a flexible hose having a first end connected with the teat cup.

Document NL 1024522 C discloses a teat cup carrier carrying at its upper side teat cups and milking means. The teat cups are capable of attaching the teat cups in an operative position with the aid of upwardly movable teat cup grippers.

A drawback of the known implement is that it is insufficiently compact in many situations, in particular in the case of cows with low udders.

The present invention aims, in the second aspect, at providing a milking implement which is more compact and which enables in particular automatic milking of especially cows with low udders in a more reliable manner.

The invention achieves this object by means of a milking implement of the type mentioned in the preamble of claim 15, wherein the teat cup holder is tiltable over an angle in a tilting plane relative to the sub-frame.

By making the teat cup holder tiltable, it is possible to bring the teat cups into a flatter position, which facilitates placing the milking implement to under the cow or other dairy animal.

In particular, the hose extends substantially in said tilting plane at least near the first end. This prevents the milk hose from projecting sidewardly in the case of a tilted teat cup holder, which may give the milking implement an undesired width. Said undesired width may lead to the cow pushing or walking against the milk hose, which provides a risk of damage or irritation.

A advantageously amounts to at least 70°, and preferably to approximately 90°, at which angles the effect of lowering the milking implement is considerable.

In a preferred embodiment, the bottom comprises an aperture extending at least partially below the hose, the hose being displaceable to below the bottom upon tilting of the teat cup holder with the teat cup. The bottom of a state of the art milking implement often comprises a more or less closed plate, inter alia to prevent contamination, or to prevent a milk hose from touching the ground, which is undesirable for hygienic reasons and which is often neither permitted by the rules. In the present embodiment, it is possible for the milk hose to drop through the bottom via a hole in said bottom. The bottom itself need not be closed if the milking implement as a whole continues to comply with the rules. For this purpose it is sufficient that, for example, the frame ensures that the milk hose(s) will not touch the ground. This will be explained hereinafter in further detail. The main thing is that the sub-frame bottom provided with a hole makes it possible for the milk hose to drop through said bottom, and thus provides a compact milking implement, with a tiltable teat cup holder, and without an outwardly projecting milk hose.

In one embodiment, the flexible hose comprises a second end that is fixedly connected with the frame. The second end is advantageously connected with the frame at a point located below the sub-frame if the sub-frame is in an upwardly adjusted position. In this manner a relatively favorable and stable milk transport is guaranteed, in that the milk hose has a discharge to a lower point.

The hose has advantageously a second end connected with the sub-frame with the aid of a connecting means, the connecting means comprising a pivoting portion that is pivotable in such a way that the second end is displaceable to below the bottom of the sub-frame upon tilting of the teat cup holder with the teat cup. This guarantees that, on the one hand, it is possible for the second end to be located close to the one end, i.e. at the teat cup, so that little milk hose is needed, whereas, on the other hand, the milk hose is still given very much freedom of movement. This embodiment provides in particular the possibility of guaranteeing, despite a short milk hose being used, that the second end thereof will be in a lowest possible position during milking, so that a smooth milk transport is possible.

The pivoting portion may be designed in such a way that it is possible for the second end to come almost flush with the bottom of the sub-frame, if the sub-frame is, for example, in a low position, such as during placing or positioning to under a cow. This results in a compact construction. In this case it may be sufficient to push the pivot into the relevant position by means of the frame or even the ground, but it is also possible to perform this in an active manner with the aid of a displacing means, such as an adjusting motor. When the sub-frame is moved upward, the pivot is then capable of pivoting, so that it is possible for the second connection point to come to below the bottom of the sub-frame.

In a particular embodiment, the pivoting portion comprises a stop that is capable of cooperating with the frame, wherein a lowest position of the pivoting portion relative to the frame is determined. In this embodiment, it is possible to prevent efficiently that the milk hose will be located on the ground, which is often not permitted according to the regulations, because the milk hose may then get contaminated.

In a particular embodiment, the pivoting portion comprises a stop that is capable of cooperating with the sub-frame, wherein a lowest position of the pivoting portion relative to the sub-frame is determined. In this embodiment, it is efficiently prevented that the milk hose, and in particular the second end thereof, will be at a too low level relative to in particular the first end of the milk hose. Such a too low position could, for example, cause the milk hose to be pinched, which is undesirable. In both this embodiment and the previous embodiment, the stop may consist of an element projecting from the pivoting portion, such as one or more transverse bars, which is/are then capable of abutting against a part of the frame, the sub-frame, respectively.

In a particular embodiment, the frame comprises a main bottom extending at least below the flexible hose. By means of such a main bottom it is efficiently prevented that the milk hose will touch the ground. It is then sufficient if the main bottom, at least at the place where the milk hose could touch the ground, for example at the lowest point thereof, comprises one or more components extending below it. In other words, the main bottom need not necessarily comprise a closed surface, but it is sufficient that the main bottom prevents contact with the ground at strategic places.

The frame comprises in particular a mobile vehicle, in particular an autonomous mobile vehicle. The milking implement may be designed as a milking robot in which the frame is a robot arm. The robot arm is then movable, for example for placing the sub-frame with the teat cups to under a cow or the like. In this case, the dairy animal in question is led to a milking parlour where the milking implement is located. However, the invention relates in particular and very advantageously to an autonomous mobile vehicle. The latter embodiment, even more than a stationary milking implement, should be as compact as possible. An autonomous mobile milking implement does not only have to perform manoeuvring between legs, etc. Such an implement has often also other sub-devices "on board", such as a milk storage, cleaning means, etc. This makes it even more important to design each component as compactly as possible.

Moreover, the milking implement may be provided with one or more of the particular features mentioned hereinafter.

The frame may be provided with at least two displacing means, in particular wheels or caterpillar tracks, preferably moreover with at least one additional displacing means or a sliding element. It may be sufficient for the frame mobile in this manner to have two wheels or the like for a sufficiently smooth displacement. Preferably, the frame moreover comprises a component that facilitates displacement at a third supporting point, such as an additional displacing means or a sliding element. One, or preferably two additional wheels, so that in total four wheels are provided, give an optimum driving comfort. On the other hand, an additional ball wheel, for example, provides a greater manoeuvrability. A possibly provided sliding element has, on the other hand, the advantage of allowing an extraordinarily robust design and of not being hindered by contamination.

In a particular embodiment, the milking implement further comprises a motor for driving at least one of the at least two displacing means. By means of such a motor the milking implement is self-propelled, and therefore need not be displaced by an operator. Such provisions have, of course, advantages in relation to the amount of work to be done by an operator, which amount may thus become very small. A motor control is advantageously provided for the driving motor. The latter may be connected, for example, with a GPS-system or the like for orientation of the milking implement in the area where it is located.

In a preferred embodiment, the milking implement further comprises a milk storage vessel. In this embodiment, the milking implement is in principle completely autonomous. After milking a cow or other animal, or several animals in the case of a sufficiently large milk storage vessel, the milking implement is capable of driving either autonomously or not to a larger milk storage tank in order to supply therein the contents of the milk storage vessel. A disadvantage of providing such a milk storage vessel is that, of course, space is needed for storing the milk. An advantage, however, is that no hoses are needed, behind which an animal may get caught. However, in another embodiment the milking implement may also be connectable or connected with a milk storage tank by means of a milk transport line. It is then possible to design such a milking implement as a particularly compact one.

In particular, the milking implement further comprises a teat detecting means, a teat cleaning device and/or a teat cup cleaning device. Such means are known in the state of the art and serve to obtain a milking implement that is more reliable, more hygienic, etc. However, it is also possible for the person skilled in the art to combine the milking implement with any other means known in the state of the art in order to obtain the advantages related thereto.

In particular, the invention relates, in a third aspect, to a milking implement comprising a frame with at least one teat cup holder with a teat cup movable relative thereto, a replacing element connected with the teat cup, and a vacuum line and a vent aperture, wherein the teat cup comprises a liner with a pulsation line connected thereto, wherein the pulsation line is alternately connectable to the vacuum line and to the vent aperture by means of a duct that is displaceable relative to the pulsation line, and wherein the replacing element comprises a winding reel, a pulling means that is capable of being wound up and wound off over the winding reel and that is led via the teat cup holder, and a winding motor with motor control for rotating the winding reel, further comprising a pulsator reel with a pulsator motor that is arranged to connect the pulsation line alternately to the vacuum line and the vent aperture by displacing the duct.

A known milking implement comprises a teat cup provided with a liner that is connected to a pulsation line that can alternately be connected to a vacuum line and a vent aperture, the aforementioned connection taking place via a rotatable reel.

The known milking implement has the disadvantage of not being particularly compact, which may be a drawback. For, often there is only a limited space to manoeuvre under the body or between the legs of a cow.

Therefore, the invention aims, in the third aspect, at providing a milking implement that is more compact.

The invention achieves this object by means of a milking implement of the type mentioned in the preamble of claim 28, wherein the displaceable duct comprises at least one recess in the pulsator reel, and wherein the pulsator reel is connectable with the winding reel. By means of such a milking implement it is possible to gain space because of the possibility of coupling the pulsator reel with the winding reel. This is possible in practice, since the operative times are in principle separated, their functions not influencing each other in a negative manner. When the pulsator reel is operative, the winding reel is not operative, in so far as the pulling means has in principle already been wound off maximally and a free travel in the pulling means has thus been created. This means that a movement back and forth, if any, of the pulling means will not be perceptible in a negative manner. Conversely, it holds that when the winding reel is operative, the pulsator reel is not operative. Neither for that reason will it be possible for the operation of the two reels to influence each other in a negative manner. Nevertheless, the connectability of the pulsator reel and the winding reel allows space saving, it now being possible for them to be placed as closely as desired to each other.

In a particular embodiment, the pulsator motor and the winding motor form one whole. In this embodiment, the pulsator motor and the winding motor are moreover coupled. Preferably, these two motors are one and the same motor, which motor is then capable of performing two functions, i.e. winding up the replacing element and connecting the pulsation line alternately to the vacuum line and the vent aperture. As indicated hereinbefore, the two functions are in principle separated, so that it is possible for them to be performed in a simple manner by one and the same motor. Of course, the motor control has to be adapted to both functions, which is achievable in a simple manner for the person skilled in the art.

Preferably, the pulsator reel is connected integrally and fixedly with the winding reel. Such an embodiment guarantees a reliable coupling between the pulsator reel and the winding reel. In this case, optimum use is made of the fact that the operations of the two reels are separated in time, so that a fixed connection of the two reels may result in a maximum gain in space and provides, moreover, a maximum reliability. In fact, the pulsator reel and the winding reel form one whole, preferably even one reel.

In a special embodiment, the duct comprises several recesses distributed over the pulsator reel. According to this embodiment, the pulsator reel comprises, besides a part over which the pulling means can be wound, several recesses distributed over the pulsator reel. In fact, however, only one recess is needed, that serves as a connecting duct between the pulsator reel and the vacuum line and the vent aperture, respectively. Incidentally, there may also be a vent duct in which, for example, a filter is placed in order to prevent contamination. It may be advantageous to provide several recesses, since otherwise the pulsator reel has to be rotated over a more or less great turn before the duct can be connected to the vacuum line and/or the vent aperture. If there are provided several ducts, i.e. several recesses, the motor has to make on average a much smaller turn before such a connection can be achieved. This is more efficient and faster. Moreover, if a duct is damaged, blocked or the like, it is possible to choose another duct by causing the motor to rotate a little turn further until a next recess is reached.

The recesses may be provided over the circumference of the reel, i.e., for example, next to the part that is used for winding the pulling means. Moreover, the recesses may be provided over an upper or lower surface of the reel, in particular over a ring that is concentric with the axis of rotation. The recesses need not be distributed evenly, but this is an advantage, of course, because the on average shortest setting time can thus be obtained.

Preferably, the pulsator motor is arranged to displace the duct with an adjustable speed. In this embodiment it is possible to adjust one or more characterizing phases of the milking turn. For, in practice it is found that the four characterizing phases of the milking process, i.e. vacuum generating phase, main milking phase, ventilation phase and release phase, are adjustable by choosing the speed of the duct. This may be explained, for example, as follows.

Based on a liner that is at ambient pressure and that is neither connected with the vacuum duct nor with the vent aperture, in a first step the liner will be connected to the vacuum line by moving the duct in the proper direction. In dependence on the speed of the duct, the mentioned connection between the pulsation line and the vacuum line will be maintained during a particular period of time. In that period of time, the vacuum line will be able to apply a particular vacuum to the liner. For example, this vacuum will be less deep if the duct moves very fast. The displacing speed that is needed to reach a particular vacuum can be established experimentally in a simple manner.

Incidentally, the vacuum to be set of the liner may be chosen in dependence on the currently prevailing milking phase, such as foremilking phase, main milking phase or post-milking phase. At any rate, it will subsequently be possible to perform the milking turn at a constant vacuum in the liner. The duration of the milking turn may be adjusted by further displacing the duct faster or more slowly. In a next step, the liner is connected to the vent aperture. Also here it holds that, if the duct is displaced faster, the difference in pressure to be achieved, in this case by ventilation, depends on the time of connection of the pulsation line to the vent aperture. If the connection time is short, there will be a remaining vacuum. Finally there is the release phase in which there is again no connection between the pulsation line and the vacuum line or the vent aperture. As pointed out hereinbefore, the currently prevailing vacuum is adjustable by moving the duct faster or more slowly during ventilation.

According to the features described hereinbefore, it is possible completely to adjust the vacuum conditions of the liner during one complete milking turn by displacing the duct at a desired speed. Individual adjustment of this speed is possible during the four different phases of the milking turn.

In a special embodiment, the pulsator reel is movable in a reciprocating manner by the pulsator motor. The pulsator reel being movable in a reciprocating manner makes it possible to connect the pulsation line in a simple and efficient manner to the duct, only one recess in the pulsator reel then being needed. It is pointed out that in the embodiments according to the fourth aspect of the invention the pulsation line is disposed in principle between the vacuum line and the vent aperture. If desired, another sequence may be applied, on condition that the duct is adapted accordingly.

In another embodiment, the pulsator reel is rotatable by the pulsator motor. In this embodiment, the pulsator reel continues to rotate when it is alternately connected to the vacuum line and the vent aperture. In that case it is advantageous if the coupling with the winding reel has been interrupted.

In particular, the invention relates, in a fourth aspect, to a milking implement comprising a frame with at least one teat cup holder with a teat cup movable relative thereto with a milk line connected to the teat cup, a replacing element connected with the teat cup, wherein the replacing element comprises a winding reel, a pulling means that is capable of being wound up and wound off over the winding reel and that is led via the teat cup holder, a winding motor with motor control for rotating the winding reel in order to wind up in this manner the pulling means.

A known milking implement comprises a teat cup holder with a replacing element connected to the teat cup. The milking implement also comprises a closing means for a milk line that is connected to the teat cup as well. Such a closing means is required to prevent that by means of the milking vacuum, that is in principle constantly being applied to the milk line, impurities are sucked in when the teat cup is not attached to a teat.

The known implement has the drawback of not being very compact, because a separate replacing element and a closing means are required. This is undesirable, since in particular for the purpose of the free movability under and between cows a milking implement is desired that is as compact as possible.

Therefore, in the fourth aspect, the invention aims at providing a milking implement that is more compact.

The invention achieves this object by means of a milking implement of the type mentioned in the preamble of claim 41, which further comprises a guide element concentric with the winding reel and extending at least over a predetermined curve, wherein the milk line is led in the guide element, wherein a pinching means extending in the direction of the guide element is disposed on the winding reel in such a way that the milk line is capable of being pinched closed, at least in the predetermined curve, with the aid of the pinching means.

In such a milking implement the closing means is coupled to the replacing element, in particular a pinching means is coupled to the winding reel, so that a very compact milking implement is provided. The pinching means may be provided as a protrusion on the winding drum or reel, the pinching means cooperating, of course, with the guide element in which the milk line is disposed. Such a guide element may be, for example, a U-section or the like. The shape of the pinching means and the guide element in combination have to be such that they are capable of cooperating to pinch the milk line closed. All this can be determined in a simple manner on the basis of the dimensions and elastic properties of the milk line.

The predetermined curve has, of course, to be smaller than 360°, because otherwise the milk line would constantly be pinched closed. Precisely a non-complete curve provides the possibility of closing the milk line when this is desired.

In a preferred embodiment, the predetermined curve comprises a curve not exceeding 180°. However, the predetermined curve may also be clearly smaller. All this is connected with the (average) turn made by the winding reel when winding up the pulling means. All this will be explained hereinafter in further detail in relation to the operation of this milking implement.

In a first position, the position in which milking is possible, the pulling means is maximally released, and the pinching means is not located in the guide element. This means that the milk line is free, and that milk can be sucked in by the milk line. After the milking has been ended, the winding reel will be rotated in order to replace the teat cup onto the teat cup holder. Since at that moment the milk line has to be closed, it is preferred if already at a small rotation of the winding reel the pinching means will get into the guide element and pinch the milk line closed there. Subsequently, replacing of the teat cup onto the teat cup holder is completed by causing the winding reel to make the desired turn. During the entire turn the milk line should be closed.

For the purpose of a next attachment of the teat cup to a teat, the teat cup will first be placed on a teat. Subsequently, the winding reel will be rotated back to a position in which the pinching means leaves the guide element and thus releases the milk line. As a result thereof, milking vacuum will be applied to the teat cup and the teat cup will be sucked onto the teat. Furthermore, the winding reel will also release the teat cup by making the turn. At that moment, the cycle has been completed and a next cycle can begin.

In a particular and favorable embodiment, the frame comprises a mobile vehicle, in particular an autonomous mobile vehicle. The closing means being integrated in the pulsator/winding drum provides the advantage of compactness, which is advantageous precisely with (autonomous) mobile milking implements. For, these implements have to manoeuvre between, for example, legs of dairy animals. Moreover, they are often provided with additional sub-implements, such as a milk storage vessel, cleaning means, navigation means, etc., so that each space saving may be advantageous.

In particular, the invention relates, in a fifth aspect, to a milking implement comprising a frame with at least one teat cup holder with a teat cup movable relative thereto, a replacing element connected with the teat cup, wherein the replacing element comprises a winding reel, a pulling means that is capable of being wound up and wound off over the winding reel and that is led via the teat cup holder, and a winding motor with motor control for rotating the winding reel in order to wind up in this manner the pulling means with a winding up force.

A known milking implement comprises such a replacing element with winding reel and winding motor, wherein the winding motor has a motor control that is adapted to rotate the winding motor over a specific turn, the replacing element covering substantially a fixed distance. A disadvantage of the milking implement is that in the case of undesired dislocation of the replacing element, when the replacing element is being wound up, etc., the replacing element does no longer function efficiently. For, in the case of a too short turn, the replacing element will not be able to replace the teat cup in a reliable manner onto the teat cup holder.

The milking implement according to the fifth aspect of the invention aims at providing a more reliable milking implement, in particular with a more reliable replacing element and control thereof.

The invention achieves this object by means of a milking implement of the type mentioned in the preamble of claim 49, wherein the motor control is adapted to put the winding motor out of operation when the winding up force exceeds a predetermined maximum winding up force. In the case of such a motor control, a particular fixed turn has not to be taken into account, because the motor control simply continues to wind up until a particular resistance is met in the form of a winding up force. This means that the motor control is always capable of replacing the teat cup in a reliable manner onto the teat cup holder. Elongation, dislocation and the like of the replacing element can be met in a simple manner.

For example, the pulling means comprises a cord or chain. Such a pulling means can be manufactured in a reliable, easy and simple manner. Such a cord may be manufactured, for example, of synthetic material, such as nylon, of metal, such as a twined cord or cable, or be a chain in the form of links of metal or synthetic material. However, other pulling means, such as a leather belt or the like, are not excluded.

In a particular embodiment, the motor control comprises a sensor for measuring a quantity related to the winding up force. The sensor measures the quantity related to the winding up force, on the basis of which it is subsequently possible to determine the pulling force, for example by the motor control. On the basis thereof the motor control decides whether or not the winding motor has to continue winding.

In a particular embodiment, the sensor comprises a velocity meter, a current meter, a tension meter, a torque meter or a tension force meter. The velocity meter and the tension force meter measure in principle on the pulling means, whereas the current meter, the tension meter and/or the torque meter measure in principle on the winding motor. Such meters are commonly used and may be disposed in the motor control in a simple manner. If desired, other sensors may be used as well.

In a special embodiment, the motor control is adapted to regulate the winding motor in such a way that its capacity is reduced when the winding up force remains below a particular value during a predetermined period of time.

This embodiment is suitable for causing the winding motor to run at a lower capacity or even to put the winding motor out of operation, for example in the case of breakage of the pulling means being. For, in such a case, the winding up force would never exceed the predetermined maximum winding up force. The determined value may be chosen equal to the predetermined maximum winding up force, but may also be chosen lower, if desired. The predetermined period of time may be determined in a simple manner on the basis of the average turn to be made of the pulling means divided by the average speed during that turn. If desired, a margin, such as a factor 3 or the like, may be included. The motor control is advantageously adapted to supply an alarm signal when the winding motor is put out of operation on the basis of this condition.

In a particular embodiment, the motor control is adapted to apply a predetermined post-milking pulling force to the pulling means connected with the teat cup in an operative position of the teat cup. Herein, the operative position of the teat cup is a position on a teat, a milking vacuum having been applied. This milking vacuum ensures inter alia that the teat cup will remain firmly connected to the teat. The post-milking pulling force may be applied, for example, after the milking implement has established that the post-milking phase has started. For this purpose, the motor control may be coupled with a milking implement control that is either disposed on the milking implement, or that controls the milking implement from an external position. The post-milking pulling force is chosen in dependence on the animal to be milked and, if desired, on further properties of this animal. It is possible for the person skilled in the art to establish these in a simple manner according to the known indicated principles.

In a special embodiment, the pulling means is capable of being wound off over a winding off length that is at least twice as great as a maximum free length of the pulling means between the winding reel and the teat cup in an operative position of the teat cup. This embodiment has the advantage that, if a breakage occurs, in many cases it is possible for the pulling means to be repaired in a simple manner and still to function efficiently thereafter. For, a breakage in the part of the pulling means between the teat cup and the connection point on the teat cup holder, i.e. the free travel, will often occur. For, this is the point of the greatest friction or of the greatest risk of damage from outside. When replacing the teat cup in the case of a broken pulling means, the motor control will establish that a breakage has taken place and will stop winding up and possibly give an alarm signal. The operator will then be able to repair this pulling means, for example by knotting, welding or the like of the broken pulling means. Even in the case of a modified total length of the pulling means owing to this, there will be no error in operation, because in all cases the motor control is capable of replacing the teat cup in a reliable manner onto the teat cup holder, independently of the length of the pulling means.

It is noted that a milking implement that combines two or more of the aspects may also be advantageous because of an even better compactness to be obtained. In particular, each of the first through fifth aspect of the invention may be combined with at least one other of the first through fifth aspects of the invention.

BRIEF DESCRIPTION OF THE DRAWINGS

The invention will be explained hereinafter in further detail with reference to the drawings, in which some non-limiting exemplary embodiments are shown, and in which:

FIG. 4 is a schematic side view of a part of an embodiment of the milking implement according to the third aspect of the invention;

FIG. 5 shows, in plan view, a detail of FIG. 4;

FIG. 6 shows in a schematic side view a detail of an embodiment according to the fourth aspect of the invention;

FIG. 7 shows the detail shown in FIG. 6 in a view perpendicular thereto;

FIG. 8 shows the embodiment according to FIGS. 6 and 7 in a theoretical rolled out form; and FIG. 9 is a schematic side view of a part of an embodiment of the milking implement according to the fifth aspect of the invention.

DESCRIPTION OF ILLUSTRATIVE EMBODIMENTS

Figure 1A:
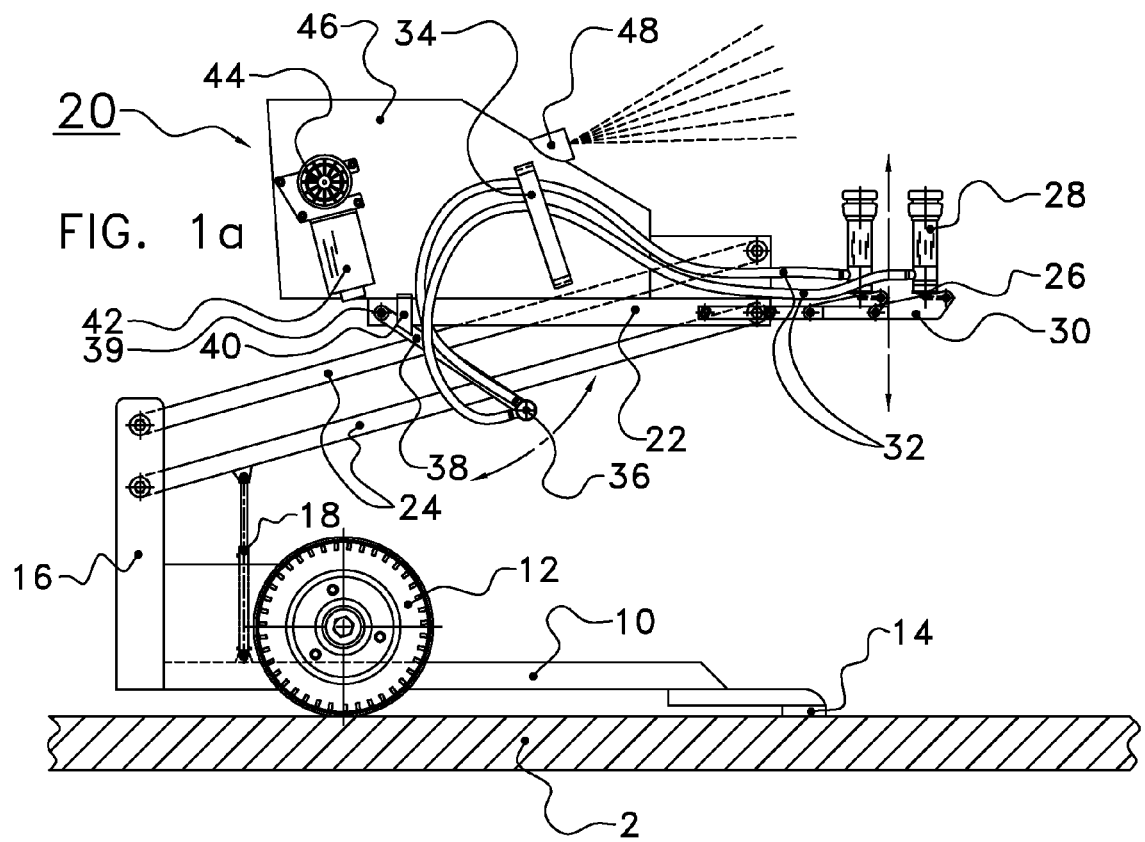
FIGS. 1*a* and 1*b* are schematic side views of an embodiment of the milking implement according to the invention.
Figure 1B:
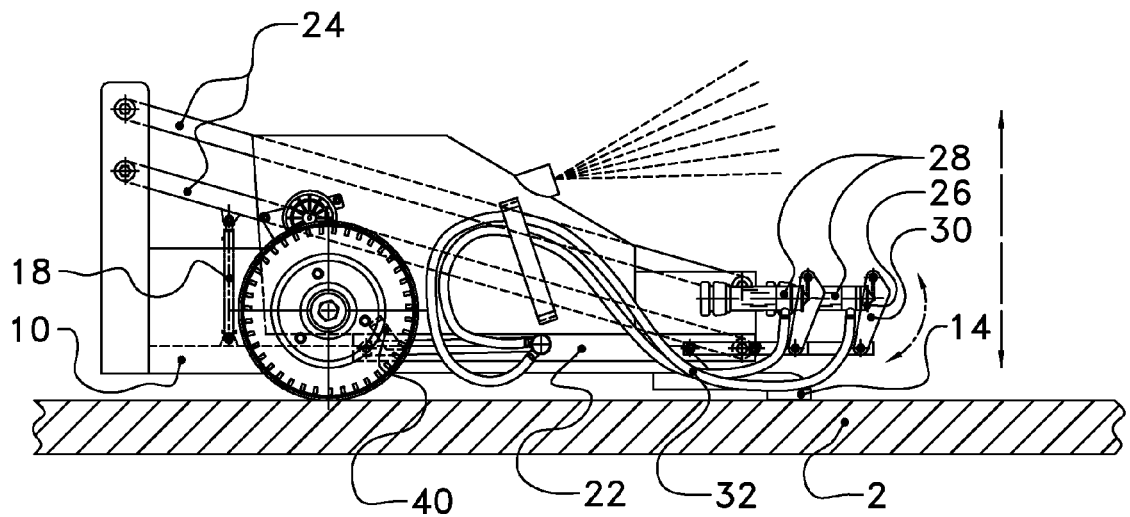

The following is a description of certain embodiments of the invention, given by way of example only and with reference to the drawings. FIGS. 1*a* and 1*b* are schematic side views of an embodiment of the milking implement according to the invention, in an upper and a lower position, respectively.

Here, the reference numeral 2 designates the floor on which the milking implement is supported. The latter comprises a frame 10 and a sub-frame 20.

The frame 10 comprises wheels 12 and a sliding shoe 14, as well as an upright portion 16. The sub-frame 20 comprises a bottom portion 22 and a casing 46, and a height adjusting device with a cylinder 18 and a parallelogram construction 24. Furthermore, there are provided in total four (of which two visible) teat cup holders 26 each with a teat cup 28 and each disposed on a tiltable intermediate arm 30. Milk lines 32 extend via a bracket 34 to the milk discharge tube 36; 38 is a pivoting portion that is capable of pivoting about a pivot axis 39, and that is provided with a stop 40.

42 designates a connection for a vacuum line, and 44 a pulsator/winding drum that is disposed on the casing 46. The casing 46 is also provided with a teat detecting camera 48.

As shown in FIG. 1*a*, the milking implement comprises two wheels 12 and a sliding shoe 14. There is thus obtained a good compromise between mobility by means of wheels that are capable of driving rather easily over, for example, small obstacles, and a small height by means of a sliding shoe. The latter is very advantageous when placing the milking implement to under an animal's udder. The wheels 12 may optionally be driven by a (non-shown) motor, preferably even each by a motor. The latter offers the advantage of no axle being necessary between the wheels 12, and, moreover, of manoeuvrability being provided in a simple manner by an independent control of the wheels. A control of the motor or motors, and consequently of the milking implement, may also be provided on the implement. Alternatively, the milking implement may also be equipped without a motor, the implement being driven, for example manually, to under a cow or being brought otherwise to under a cow.

It is pointed out that here is only shown a mobile embodiment of the milking implement according to the invention. An alternative embodiment comprises a stationary milking implement with a movable robot arm. This may be read in the figures, for example, by imagining the wheels 12 omitted. Incidentally, in practice, the robot arm will be designed as a one that is capable of being completely folded up sidewardly.

Returning to the embodiment shown, the frame 10 need not comprise much more than a supporting structure that is preferably built up in such a way that several lines of the milking implement, such as milk lines 32, are prevented from touching the floor 2. This is explained in further detail in respect of FIG. 1*b*.

The sub-frame 20 is adjustable in height relative to the frame 10 and consequently to the floor 2. For this purpose, the implement comprises a retractable and extendable cylinder 18 that is connected between the frame 10 and the sub-frame 20, in particular with one of the two parallel bars of a parallelogram construction 24. By retracting or extending the cylinder 18, the bars 24 of the parallelogram construction will pivot, and the sub-frame 20 will be displaced. The adjustment in height is desirable to be able to attach the teat cups 28 at different (udder) heights. Incidentally, instead of the parallelogram construction 24 and the single cylinder 18, other height adjustment mechanisms may be applied as well, such as a combination of a crown wheel and a gear wheel cooperating therewith, the sub-frame being connected with one (gear) wheel and the frame with the other (gear) wheel, or for example a plurality of cylinders, etc.

The milk lines 32 extend via a guide bracket 34 to a milk discharge tube 36 that is connected (in a non shown manner) to a (neither shown) milk storage. It is visible that the ends of the milk lines 32 at the side of the connection to the milk discharge tube 36, together with the milk discharge tube 36, have dropped to below the bottom portion 22, which guarantees inter alia an improved milk discharge. For that purpose, the pivoting portion 38 is capable of pivoting about the pivot axis 39. In order to prevent a too great deflecting or pivoting movement, there may optionally be provided a stop 40 that is capable of cooperating with the bottom portion 22. When discussing FIG. 1*b*, this will be explained in further detail. The parts described in this paragraph, and their properties, are optional, apart from the milk lines 32, and largely reflect the advantages of the second aspect of the invention.

There may be provided a milk storage in the form of an external milk tank, the milking implement and the milk tank then being interconnected by means of a hose extending, for example, from the milk discharge tube 36. Alternatively, a milk storage vessel is provided on board of the milking implement, for example in the area near or between the wheels 12, or in the pulsator/winding drum 44.

Moreover, the teat cups are connected via a non-shown vacuum or pulsation line to the associated connection 42 that is itself operatively connected with the pulsator/winding drum 44 that may be chosen according to the state of the art, and will not be explained in further detail. The drum 44 is disposed on the supporting structure 46 that need not comprise much more than a mounting plate or the like. Incidentally, other pulsator mechanisms may be selected, such as electromechanical valves etc.

There is further shown a teat detecting camera 48 for detecting the positions of teats of an animal to be milked. Such a teat detecting camera is known per se to the person skilled in the art and will therefore not be described here in further detail. However, it is pointed out that the camera may additionally be equipped for recognizing legs and other obstacles, as well as for navigating in areas such as sheds and milking parlours. The latter option will in particular be useful, of course, if the milking implement is provided with a drive for autonomous self-propelled movement.

FIG. 1*b* shows the milking implement according to FIG. 1*a*, but now in a lowest position, for example to be able to dispose the implement to under a cow with a low udder. In FIG. 1*b*, like in the other figures of the drawing, corresponding elements are indicated by the same reference numerals.

It is visible that the cylinder 18 is maximally retracted, so that the sub-frame is in a lowest possible position, and closest possible to the frame 10.

FIG. 1*b* shows advantages of the second aspect of the invention. The teat cup holders 26 are somewhat tilted relative to the intermediate arms 30, the arrangement being such that the teat cups 28 are arranged substantially horizontally. The milk lines 32 then drop to below the bottom portion 22 and are prevented by, for example, the sliding shoe 14, or by another means suitable for that purpose of the frame 10, from touching the ground 2. Furthermore, it is visible that the pivoting portion 38, for which it is no longer possible to drop to below the bottom portion 22, is folded up so as to be substantially parallel to the bottom portion 22. Folding up may be motor-controlled with the aid of an optional and non-shown drive, or may take place in a passive manner, for example because the milk lines 32 come under tension as a result of the sub-frame folding down, and will consequently pull up the pivoting portion. It is important that the milking implement as a whole will be extraordinarily compact. For it is possible for the sub-frame to drop, and for the teat cups to be folded down, while it is possible for the milk lines to reach a lowest possible position and the sliding shoe moreover requires a minimal construction height. It is thus possible in practice to provide a mobile or even a self-propelled milking implement that is suitable for milking cows or other animals whose teats are located at only a few centimetres above the ground. In particular with smaller dairy animals this may offer great advantages.

Herein, it is important that the milking implement as a whole will be extraordinarily compact. For it is possible for the sub-frame to lower, and for the teat cups to be folded down, while it is possible for the milk lines to reach a lowest possible position and the sliding shoe moreover requires a minimum construction height. It is thus possible in practice to provide a mobile or even a self-propelled milking implement that is suitable for milking cows or other animals whose teats are located at only a few centimetres above the ground. In particular with smaller dairy animals this may offer great advantages.

Figure 2A:
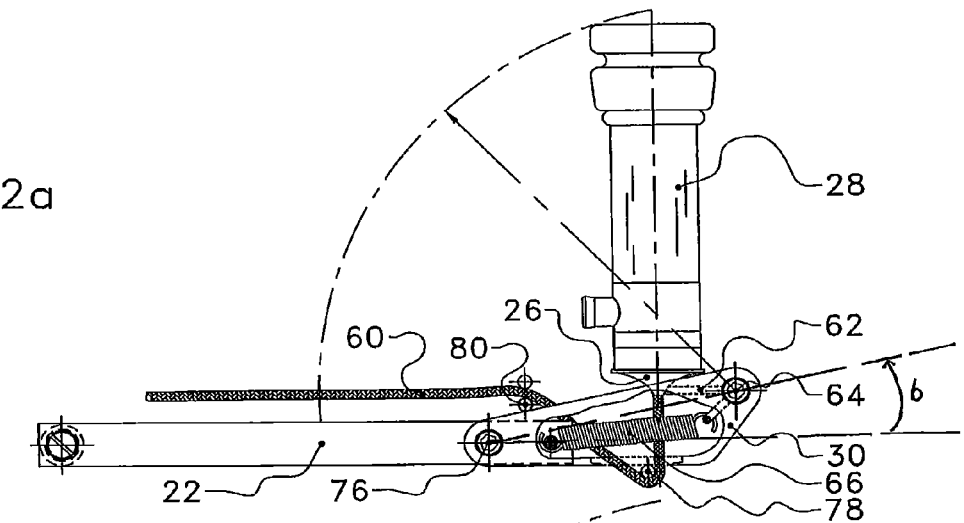
FIGS. 2*a*, *b* and *c* show schematically three side views of an optional further detail according to the first aspect of the invention.

FIGS. 2a, b and c show schematically three side views of a further detail of the invention.

Figure 2B:
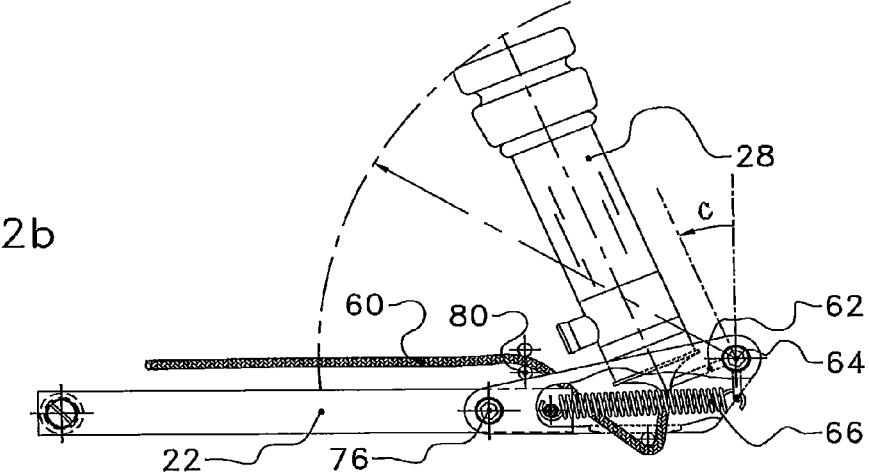
Figure 2C:
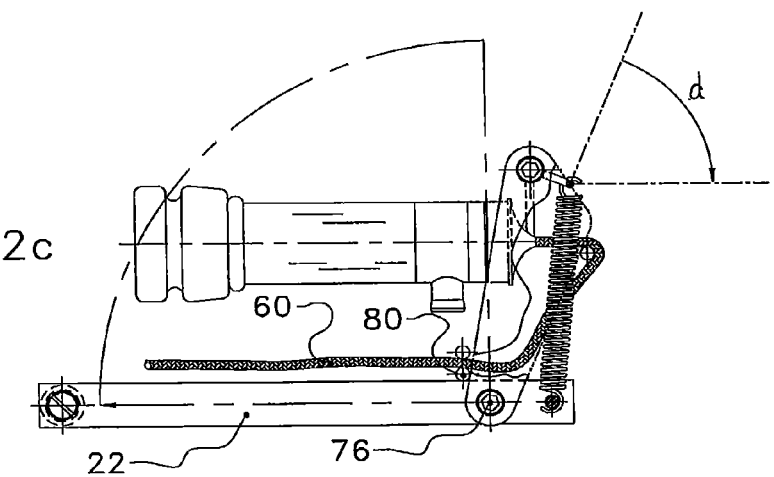

FIG. 2a shows the situation during milking, i.e. with completely relaxed cord, while FIGS. 2b and 2c show a first and a second phase, respectively, of the folding of the teat cup.

Here, 28 is a teat cup on a teat cup holder 26, with connected thereto a replacing element 60 that is led via a first guide element 78 and a second guide element 80 that are both fastened to an intermediate arm 30 that is capable of pivoting about an axis 76. The teat cup holder 26 is fastened to an end of a small arm 62 that is pivotable about an axis 64 and that is connected at the other end with a spring 66 that is connected itself with the bottom portion 22.

In the position shown, the teat cup 28 is upright, as is usual for milking. This is ensured by the spring tension of the spring 66. The replacing element 60 is free of tension, and the teat cup is capable of moving freely, and may therefore also be detached from the teat cup holder by the cow if she moves, for example, to some extent.

When the milking has been ended and the teat cup 28 has been detached, the latter will be replaced in the first instance onto the teat cup holder 26. This takes place by winding up the replacing element 60. When winding ensures that the teat cup has been replaced, and consequently the situation of FIG. 2a has been reached, at further winding of the replacing element 60 the latter will exert a pulling force on the teat cup holder 26, via the small arm 62; this will cause the teat cup holder 26 with the teat cup 28 to tilt, so that the risk of impurities, for example falling from the cow, getting into or even being sucked into the teat cup, is reduced. The tilting continues in principle until a maximum angle d is reached, the spring force moment and the cord pulling force moment cancelling each other relative to the axis 64. This is shown in FIG. 2b. However, alternatively and/or additionally it is possible to have a second tilting movement performed, and in particular that shown in FIG. 2c.

In FIG. 2c the cord pulling force is sufficient to produce the spring resistance against tilting about the axis 76. This will cause the intermediate arm to tilt further until the teat cup 28 reaches, for example, a horizontal position. For this purpose, the intermediate arm 30 has to pivot in this case over an angle d in which case c+d=90°. It is also possible to pivot about a somewhat smaller, or even a greater angle, so that it is not only guaranteed that no dirt will fall into the teat cup, but that, moreover, a smallest possible height will be assumed by the teat cups. In order to confine the angle d, the guide element 80 may, for example, cooperate with the bottom portion 22, or there may otherwise be provided one or more stops.

Figure 3:
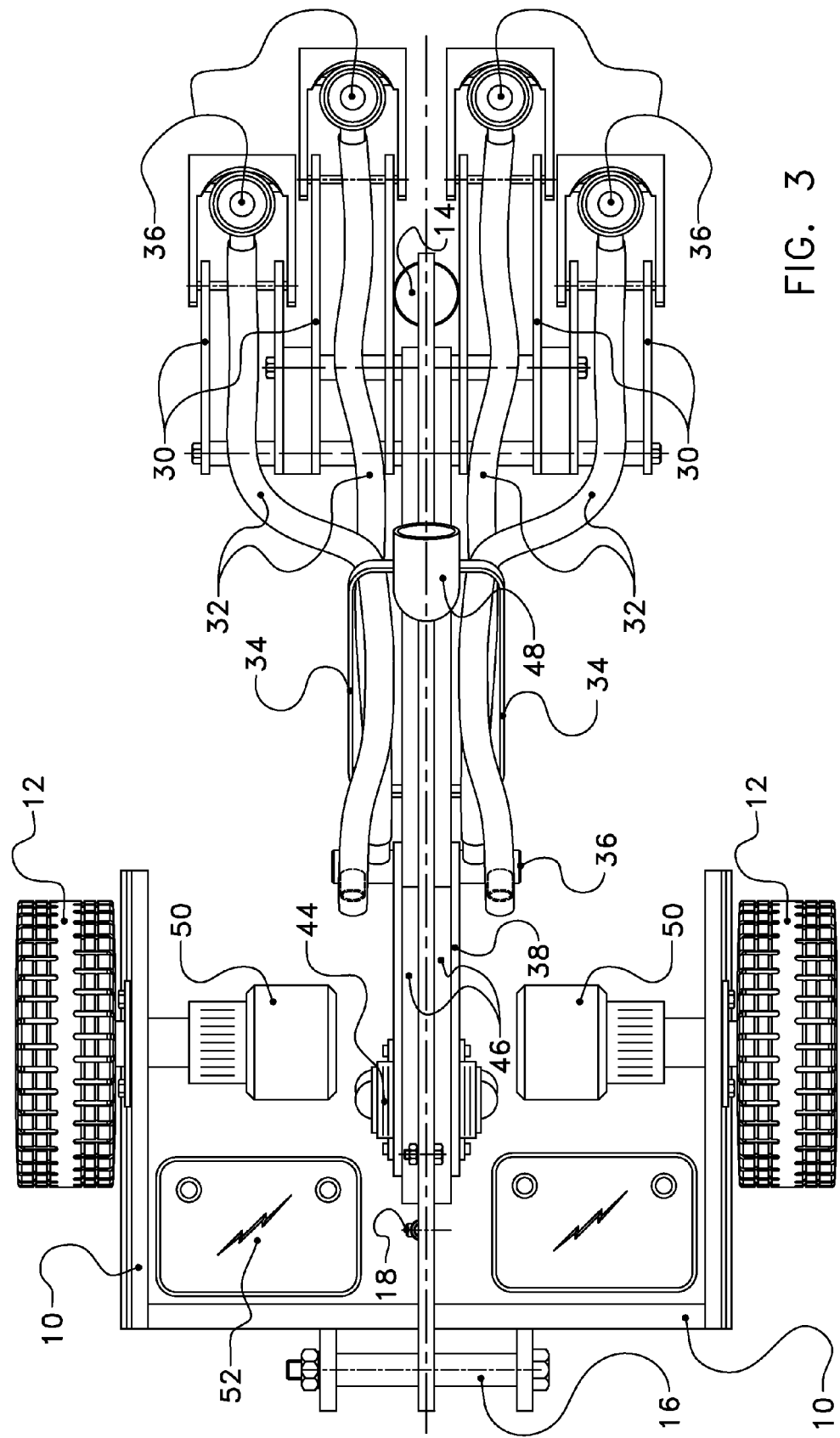
FIG. 3 shows a schematic plan view of an embodiment according to the second aspect of the invention.

FIG. 3 shows a schematic plan view of the embodiment according to FIG. 1a. Besides the components already described in respect of FIG. 1, there are shown two motors 50 as well as batteries 52, that are all optional. The batteries, one of which could also be, for example, a milk storage vessel, serve to feed the motors, cylinder 18, teat detecting camera 48, etc. The motors 50 drive the wheels 12, more specifically independently, so that a great manoeuvrability can be guaranteed.

It is clearly visible that the milking implement as a whole, at the end located at the side of the teat cups 28, is as compact as possible, having a width that is substantially determined by the bracket 34 and a height that is determined by the teat detecting camera 48. Said end is advantageously compact, because in this manner the risk of coming into contact with legs or the like is as little as possible. Here, the teat cup holder(s) and intermediate arms 30, which, of course, determine the dimensions of the operative part, but have in principle a "base" that substantially corresponds with that of an udder, are abandoned.

FIG. 4 is a schematic side view of a part of an embodiment of the milking implement according to the third aspect of the invention. FIG. 5 shows, in plan view, a detail of FIG. 4.

Here, 60 is a cord that is connected with the teat cup 28, via the teat cup holder 26, and is wound around a pulsator/winding drum 44. The drum 44 has an upright edge 164 in order to prevent the cord from sliding from the winding drum. The drum 44 has a lateral surface 150 with, in this case, eight recesses 166. The recesses 166 are evenly distributed over a circle on the surface. Of course, there may also be provided fewer or more recesses, with a minimum of one recess. Moreover, these need not necessarily be provided evenly.

There are further shown, in a cross-sectional side view, a pulsation line 162, a vacuum line 170 and a vent line 172. The pulsation line 162 is connected at the other end to the liner of the teat cup 28. Here it is pointed out that a connection for a milk line is not separately shown. Said connection could, for example, be provided beside the pulsation line connection, rotated over a small angle. Alternatively, it is possible to provide the milk line and the pulsation line in one combined line. There is thus obtained an extra compact milking implement.

The recesses 166 and the cross-section and positions of the three mentioned lines 162, 170, 172 are such that it is possible for the recess 166 to form a connection between the pulsation line 162 and the vent line 172 and/or the vacuum line 170. In this manner it is possible to vary the pressure in the pulsation line 162, i.e. in the liner in the teat cup 28. Here it is important that the dimensions of the recess 166 are such that a position is also possible in which the pulsation line 162 has neither a connection with the vent line 172, nor with the vacuum line 170.

Varying the pressure in the pulsation line 162 is achieved by rotating the drum 44 in such a way that the desired connection between the pulsation line 162 and the vent line 172 or the vacuum line 170 will be achieved. All this will be explained in further detail with reference to FIG. 3. Incidentally, it is emphasized here that rotation of the drum 44 has no influence on the way of operating of the milking implement as regards the position of the teat cup 28 if the latter is attached to a teat, because the replacing element 60 allows a much greater free travel than required for achieving the desired rotation.

FIG. 5 shows in a schematic cross-section, and viewed from above, a detail of FIG. 4. Here, 164 is the edge of the drum 44, with the recesses 166 indicated therein. Furthermore are indicated the vacuum line 170, the pulsation line 162 and the vent line 172. These are anchored in a line block 174.

Rotation of the drum 44 to bring the recess 166 into a desired position may take place by displacing the drum 44 or by moving it in a reciprocating manner. The latter offers, of course, the advantage that the free travel length of the replacing element 60 will be least influenced. The reciprocating movement may take place around a recess 166, but alternatively it is also possible to cause the drum 44 to make such a great turn that several recesses 166 successively connect the pulsation line 162 with the vent line 172 and the vacuum line 170, respectively. The reverse movement may, for example, take place after a turn comprising two, three or more recesses 166. This may have advantages in energy saving, since maintaining a fast reciprocating movement consumes more energy than a rotation comprising only sparse reverse movements.

In the figure, a recess 166 is positioned in such a way that the pulsation line 162 is connected to the vacuum line 170. All this also implies, of course, that the pressure in the pulsation line 162 will decrease. If the drum 44 moves in the direction of the arrow D, the connection with the vacuum line 170 will be interrupted, until the pulsation line comes into connection with the vent line 172, after which the pressure in the pulsation line 162 will again increase, to a maximum of the ambient pressure.

Preferably, the edge 164 of the drum 44, the line block 174, that is incidentally optional, and the mentioned lines 162, 170, 172, or at any rate at least the ends thereof, are manufactured of smooth and/or wear-resistant materials. For example, the edge of the drum 44 is manufactured of stainless steel, that is preferably ground, polished, etc. The line block 174 may, for example, comprise carbon having good lubricating and sliding properties. Of course, many other materials may be used as well.

FIG. 6 shows in a schematic side view another detail of an embodiment according to the fourth aspect of the invention. FIG. 7 shows the detail shown in FIG. 6 in a view perpendicular thereto. FIG. 8 shows the embodiment according to FIGS. 6 and 7 in a theoretical rolled out form.

FIG. 6 shows a teat cup 28, a winding drum 44, a cord 60 and a milk line 32. The cord 60 extends, via a non-shown teat cup holder, from the teat cup 28 to the winding drum 44, in particular to a winding drum portion 44*a*. Besides, a milk line 32, in particular a milk line portion 44*b*, extends from the teat cup 28 to the winding drum 44. Both the replacing element 60 and the milk line 32 may be led via guide wheels 88. Incidentally, these may also coincide for the greater part, but for the sake of clarity they are depicted at different positions. Both the cord 60 and the milk line 32 are partially wound around the winding drum 44. In this case the milk line 32 is led within a guide element 82. There is further provided a protrusion 84 on the winding drum 44. The inner and outer diameter of the milk line 32, as well as the distance between the winding drum 44 and the guide element 82 and the dimensions of the protrusion 84 are chosen in such a way that it is possible for the protrusion to pinch closed the milk line led in the guide element.

The protrusion 84 serves to pinch the milk line 32 closed, and thus to prevent that, by means of the milking vacuum applied in principle continuously, impurities could be sucked into the milk line. The protrusion thus operates as a closing means. The mode of operation is as follows. In practice, there will be a specific turn over which the winding drum 44 rotates in order to release the teat cup 28. The replacing element 60 will have a specific free length associated therewith. When the teat cup 28 is attached to the teat of an udder, the vacuum has to be applied after the teat cup 28 has been properly positioned. By releasing the milking vacuum the teat cup 28 will be sucked in a proper manner to the teat, and falling off will be prevented. Subsequently it is possible to release the replacing element 60 by rotating the winding drum 44 over the desired turn. During this turn the milk line 32 should be open. Therefore, the protrusion 84 should be located outside the guide element 82. In other words, the drum 44 will then have been rotated in such a way that the protrusion 84 will be located in the left half of the figure. Subsequently, at a given moment the milking step will be ended. At that moment, the vacuum is to be removed, wherein the milk line 32 will then be pinched closed. This, again, can take place by rotating the protrusion 84 into the guide element 82, where it can pinch the milk line 32 closed. In the figure this means that the protrusion 84 will be rotated into the guide element 62, either at the upper side or the lower side thereof. Since, moreover, subsequently the replacing element 60 has to be wound up, this will result in practice in a positioning at the lower side of the guide element, after which the winding drum 44 will be rotated further in the direction of arrow E. During rotation the replacing element 60 is wound up further, while the protrusion 84 moves through the guide element 82. It is pointed out that in this case the milk line 32 is arranged fixedly and is, therefore, not wound up, but slides over the milk line portion 44*b*. It is further pointed out that the milk line 32 is open during a part of the rotation of the winding drum, i.e. beginning in the end position of milking a cow, with tightened cord and closed milk line, to the initial position for milking the next cow. During this preparation for the next cow, the winding drum is rotated in a direction opposite to the direction of arrow E, and the protrusion 84 will leave the guide element 82 at the lower side thereof after approximately a half turn. The milk line is then opened, but the winding drum 44 still has to be rotated (approximately) a half turn further, in order to rewind the replacing element 60. To this end, the winding portion 44*a*, unlike what is shown in the drawing, preferably only comprises not more than one turn of the replacing element 60. During rewinding, the teat cup 28 is not attached, but the milk line 32 is open. During this part, the milk line 32 should preferably be closed externally, although this is not necessary. After rewinding completely, it is possible for the protrusion 84 to be located again, if desired, in the upper part of the guide element, and as a result thereof to close again the milk line 32.

FIG. 7 shows the drum 44 in another, perpendicular side view. The winding portion 44*a* and the milk line portion 44*b* are clearly visible. The replacing element 60 is shown here in a position in which it is has been wound some turns, which may be advantageous if it breaks as a result of wear or the like, and has to be fastened again.

FIG. 8 shows a theoretical "wound off" or rolled out model of a part of the drum 44 of FIG. 2. Here, a ring-shaped part of FIG. 6, around the outer circumference of the drum 44, is shown in a cut-away and rolled out view.

Therefore, of the drum 44 only a wall portion is shown here. Besides, the milk line 32 with the line wall 33 is shown in the guide element 82, with the first and second supply guide elements 86-1 and 86-2. The protrusion 84 pinches the milk line 32 closed at a position.

When the drum 44 is rotated, the protrusion 84 moves through the guide element 82 and will pinch the milk line 32 closed as long as the latter is located in the guide element 82. Outside the guide element the milk line will be open.

FIG. 9 is a schematic side view of a part of an embodiment of the milking implement according to the fifth aspect of the invention.

Here, 60 is a cord that is connected with the teat cup 28, via the teat cup holder 26, and is wound around a pulsator/winding drum 44. The drum 44 has an upright edge 164 in order to prevent the cord from sliding from the winding drum. The drum 44 has a side surface 150 and is rotatable about a winding axis 168. Not shown is a winding motor that may be located for example in the winding drum 44, or may also be external, and is capable of driving the winding axis 168 via a transmission.

The winding motor is capable of winding up the cord 60 in order to replace in this manner the teat cup 28 onto the teat cup holder 26. The winding motor then continues to wind until the teat cup 28 has been replaced completely onto said teat cup holder 26. It is possible to determine that moment because the winding up force then strongly increases. If the winding up force is measured, for example by means of a non-shown torque meter on the winding motor or winding axis 168 or the like, it is possible to determine the moment to stop winding. The motor may then either stop completely, or apply a (much) lower winding force, in order thus to fix the teat cups in a reliable manner.

The moment to stop winding is independent of a cord length, so that also in the case of elongation, replacing remains reliable. In the case of breakage of the cord, there will never be a moment of increase of the winding force. Therefore, the winding motor preferably comprises a time limiting device in order to suspect cord breakage after a particular period of time in which no winding force increase occurs, and to stop winding.

Incidentally, it is emphasized here that rotation of the drum 44 has no influence on the way of operating of the milking implement as regards the position of the teat cup 28 if the latter is attached to a teat, because the replacing element 60 allows a much greater free travel than required for achieving the desired rotation.

Thus, the invention has been described by reference to certain embodiments discussed above. It will be recognized that these embodiments are susceptible to various modifications and alternative forms well known to those of skill in the art. Accordingly, although specific embodiments have been described, these are examples only and are not limiting upon the scope of the invention. The person skilled in the art will be able to apply various modifications and adaptations within the scope of the invention, the scope of protection for the invention being determined by the accompanying claims.

What is claimed is:

1. A milking implement comprising:
   a frame with, disposed thereon, at least one teat cup holder with a teat cup movable relative thereto; and
   a replacing element directly connected with at least one of the teat cup holder and the teat cup;
   wherein the frame further comprises an intermediate arm connected with the frame and with the teat cup holder, the teat cup holder being connected to the intermediate arm via a first joint and tiltable with respect to the intermediate arm about the first joint, and the intermediate arm being connected to the frame via a second joint and tiltable with respect to the frame about the second joint, the teat cup holder and the intermediate arm being tiltable with the aid of the replacing element, a small arm directly fastened at one end to the teat cup holder, and a spring coupled between the small arm and the frame.

2. A milking implement as claimed in claim 1, wherein the first and second joints are adapted to tilt in the same plane.

3. A milking implement as claimed in claim 1, wherein a line through the first joint and the second joint makes an angle b with respect to the frame, and the first joint is adapted to tilt over an angle c, where angle c is at least as great as angle b.

4. A milking implement as claimed in claim 3, wherein the second joint is adapted to tilt over an angle d, and wherein the angle c and the angle d form together a right angle.

5. A milking implement as claimed in claim 1, comprising a plurality of teat cup holders, each having a teat cup, a replacing element, a first and a second joint, and a spring.

6. A milking implement as claimed in claim 5, wherein at least two teat cup holders have at least one joint comprising a pivot allowing tilting in one tilting plane, at least two of the tilting planes making an angle unequal to zero with respect to each other.

7. A milking implement as claimed in claim 1, wherein the frame comprises a mobile vehicle.

8. A milking implement as claimed in claim 1, wherein the frame is provided with at least two caterpillar tracks or wheels.

9. A milking implement as claimed in claim 8, further comprising a motor for driving at least one of the two tracks or wheels.

10. A milking implement as claimed in claim 1, further comprising a milk storage vessel.

11. A milking implement as claimed in claim 10, wherein the milk storage vessel is disposed at least partially within a pulsator reel and/or a winding reel.

12. A milking implement as claimed in claim 1, further comprising a teat detector, a teat cleaning device and/or a teat cup cleaning device.

13. A milking implement as claimed in claim 1, further comprising:
   a sub-frame with a bottom, and connected with the frame and adjustable in height relative thereto;
   at least one teat cup holder with a teat cup movable relative thereto, attached to the bottom of the sub-frame; and
   a milk line comprising a flexible hose having a first end connected with the teat cup;
   wherein the tilting of the teat cup holder is over an angle a in a tilting plane relative to the sub-frame, the hose extending substantially in the tilting plane at least near the first end.

14. A milking implement as claimed in claim 13, wherein the angle a is at least 70°, and wherein the bottom comprises an aperture extending at least partially below the hose, the hose being displaceable to below the bottom upon tilting of the teat cup holder with the teat cup.

15. A milking implement as claimed in claim 13, wherein the flexible hose comprises a second end that is fixedly connected with the frame.

16. A milking implement as claimed in claim 13, wherein the hose has a second end connected with the sub-frame with the aid of a pivotable connection that is pivotable in such a way that the second end is displaceable to below the bottom of the sub-frame upon tilting of the teat cup holder with the teat cup.

17. A milking implement as claimed in claim 13, wherein the pivoting portion comprises a stop that is capable of cooperating with the frame, wherein a lowest position of the pivoting portion relative to the frame is determined.

18. A milking implement as claimed in claim 13, wherein the pivoting portion comprises a stop that is capable of cooperating with the sub-frame, wherein a lowest position of the pivoting portion relative to the sub-frame is determined.

19. A milking implement as claimed in claim 13, wherein the frame comprises a main bottom extending at least below the flexible hose.

20. A milking implement as claimed in claim 13, wherein the frame comprises a mobile vehicle.

21. A milking implement as claimed in claim 13, wherein the frame is provided with at least two caterpillar tracks or wheels.

22. A milking implement as claimed in claim 21, further comprising a motor for driving at least one of the two tracks or wheels.

23. A milking implement as claimed in claim 13, further comprising a milk storage vessel.

24. A milking implement as claimed in claim 23, wherein the milk storage vessel is disposed at least partially within a pulsator reel and/or a winding reel.

25. A milking implement as claimed in claim 13, further comprising a teat detector, a teat cleaning device and/or a teat cup cleaning device.

26. A milking implement as claimed in claim 1, further comprising:
a vacuum line and a vent aperture;
wherein the teat cup comprises a liner with a pulsation line connected thereto,
wherein the pulsation line is alternately connectable to the vacuum line and to the vent aperture by means of a duct that is displaceable relative to the pulsation line, and
wherein the replacing element comprises:
a winding reel;
a pulling element for winding on and off the winding reel; and
a winding motor for rotating the winding reel;
further comprising a pulsator reel with a pulsator motor that is arranged to connect the pulsation line alternately to the vacuum line and the vent aperture by displacing the duct,
wherein the displaceable duct comprises at least one recess in the pulsator reel, and
wherein the pulsator reel is connectable with the winding reel.

27. A milking implement as claimed in claim 26, wherein the pulsator motor and the winding motor form one whole.

28. A milking implement as claimed in claim 26, wherein the pulsator reel is connected integrally and fixedly with the winding reel.

29. A milking implement as claimed in claim 26, wherein the duct comprises several recesses distributed over the pulsator reel.

30. A milking implement as claimed in claim 26, wherein the pulsator motor is arranged to displace the duct with adjustable speed.

31. A milking implement as claimed in claim 26, wherein the pulsator reel is movable in a reciprocating manner by the pulsator motor.

32. A milking implement as claimed in claim 26, wherein the pulsator reel is rotatable by the pulsator motor.

33. A milking implement as claimed in claim 26, wherein the frame comprises a mobile vehicle.

34. A milking implement as claimed in claim 26, wherein the frame is provided with at least two wheels or caterpillar tracks.

35. A milking implement as claimed in claim 34, further comprising a motor for driving at least one of the wheels or caterpillar tracks.

36. A milking implement as claimed in claim 26, further comprising a milk storage vessel.

37. A milking implement as claimed in claim 36, wherein the milk storage vessel is disposed at least partially within the pulsator reel and/or the winding reel.

38. A milking implement as claimed in claim 26, further comprising a teat detector, a teat cleaning device and/or a teat cup cleaning device.

39. A milking implement as claimed in claim 1, wherein the replacing element comprises:
a winding reel;
a pulling element for winding on and off the winding reel;
a winding motor for rotating the winding reel to wind up the pulling element; and
further comprising a guide element concentric with the winding reel and extending at least over a predetermined curve,
wherein the milk line is led in the guide element, and
wherein a pinching element extending in the direction of the guide element is disposed on the winding reel in such a way that the milk line is capable of being pinched closed, at least in the predetermined curve, with the aid of the pinching element.

40. A milking implement as claimed in claim 39, wherein the predetermined curve comprises a curve not exceeding 180°.

41. A milking implement as claimed in claim 39, wherein the frame comprises a mobile vehicle.

42. A milking implement as claimed in claim 39, wherein the frame is provided with at least two wheels or caterpillar tracks.

43. A milking implement as claimed in claim 42, further comprising a motor for driving at least one of the wheels or caterpillar tracks.

44. A milking implement as claimed in claim 39, further comprising a milk storage vessel.

45. A milking implement as claimed in claim 44, wherein the milk storage vessel is disposed at least partially within the winding reel and/or a pulsator reel.

46. A milking implement as claimed in claim 39, further comprising a teat detector, a teat cleaning device and/or a teat cup cleaning device.

47. A milking implement as claimed in claim 1, wherein the replacing element comprises:
a winding reel,
a pulling element for winding on and off the winding reel;
a winding motor with a motor control unit for rotating the winding reel to wind up the pulling element with a winding up force,
wherein the motor control is adapted to put the winding motor out of operation when the winding up force exceeds a predetermined maximum winding up force.

48. A milking implement as claimed in claim 47, wherein the pulling element comprises a cord or chain.

49. A milking implement as claimed in claim 47, wherein the motor control unit comprises a sensor for measuring a quantity related to the winding up force.

50. A milking implement as claimed in claim 47, wherein the sensor comprises a velocity meter, a current meter, a tension meter, a torque meter, or a tension force meter.

51. A milking implement as claimed in claim 47, wherein the motor control is adapted to regulate the winding motor in such a way that its capacity is reduced when the winding up force remains below a particular value during a predetermined period of time.

52. A milking implement as claimed in claim 47, wherein the motor control is adapted to apply a predetermined post-milking pulling force to the pulling element connected with the teat cup in an operative position of the teat cup.

53. A milking implement as claimed in claim 47, wherein the pulling element is capable of being wound off over a winding off length that is at least twice as great as a maximum free length of the pulling element between the winding reel and the teat cup in an operative position of the teat cup.

54. A milking implement as claimed in claim 47, wherein the frame comprises a mobile vehicle.

55. A milking implement as claimed in claim 47, wherein the frame is provided with at least two wheels or caterpillar tracks.

56. A milking implement as claimed in claim 55, further comprising a motor for driving at least one of the wheels or caterpillar tracks.

57. A milking implement as claimed in claim 47, further comprising a milk storage vessel.

58. A milking implement as claimed in claim 57, the milk storage vessel being disposed at least partially within the winding reel and/or a pulsator reel.

59. A milking implement as claimed in claim 47, further comprising a teat detector, a teat cleaning device and/or a teat cup cleaning device.

\* \* \* \* \*